United States Patent [19]
Feess et al.

[11] 4,242,094
[45] Dec. 30, 1980

[54] DYEING PREPARATIONS AND THEIR USE FOR PREPARING DEVELOPING DYES

[75] Inventors: Erich Feess, Hofheim; Willy Gronen, Kelkheim, both of Fed. Rep. of Germany

[73] Assignee: Hoechst Aktiengesellschaft, Frankfurt am Main, Fed. Rep. of Germany

[21] Appl. No.: 13,222

[22] Filed: Feb. 21, 1979

Related U.S. Application Data

[63] Continuation of Ser. No. 845,675, Oct. 26, 1977, abandoned, which is a continuation-in-part of Ser. No. 777,633, Mar. 15, 1977, abandoned.

[30] Foreign Application Priority Data

Mar. 17, 1976 [DE] Fed. Rep. of Germany ....... 2611188

[51] Int. Cl.$^3$ ............................ D06P 3/22; D06P 3/44; D06P 3/50; D06P 3/68
[52] U.S. Cl. ........................................ 8/666; 260/144; 260/158; 260/165; 260/176; 266/203; 266/204
[58] Field of Search .................... 8/46, 47, 48, 76, 50, 8/51

[56] References Cited

U.S. PATENT DOCUMENTS

| 1,646,296 | 10/1927 | Kircheisen | 8/46 |
| 1,736,083 | 11/1929 | Kircheisen et al. | 8/46 |
| 2,267,770 | 12/1941 | Von Glahn | 8/46 |
| 2,622,959 | 12/1952 | Rampin | 8/46 |
| 2,734,793 | 2/1956 | Marnon et al. | 8/46 X |
| 2,754,171 | 7/1956 | Salvin | 8/48 |
| 3,000,298 | 9/1961 | Bryant et al. | 8/46 |
| 3,069,219 | 12/1962 | Olpin et al. | 8/46 X |
| 3,164,438 | 1/1965 | Thomas | 8/48 |
| 3,920,386 | 11/1975 | Beyer et al. | 8/48 |
| 4,057,389 | 11/1977 | Feess et al. | 8/46 X |

FOREIGN PATENT DOCUMENTS 869631  6/1962  United Kingdom .......................... 8/46

Primary Examiner—Floyd D. Higel
Attorney, Agent, or Firm—Curtis, Morris & Safford

[57] ABSTRACT

Developing dyes are especially easily produced by using preparations containing molar amounts of diazo or coupling components per weight or volume unit or a multiple or a fraction thereof in simple numerical ratios. Since the diazo component is the free finely dispersed amine these preparations are stable and allow the reaction of stoichiometric amounts. Thus, multicolor effects are feasible which hitherto could not be obtained at all or with difficulties only.

1 Claim, No Drawings

DYEING PREPARATIONS AND THEIR USE FOR PREPARING DEVELOPING DYES

This is a continuation, of application Ser. No. 845,675, filed Oct. 26, 1977, now abandoned which application was a continuation-in-part of copending application Ser. No. 777,633, filed Mar. 15, 1977, now abandoned.

Chemicals frequently employed in stock liquors with a determined content in active substance are widely used as so-called "Normal Solutions". The use of such "Normal" preparations for making developing dyes has not been considered in the past, since application of just stoichiometric quantities of diazo components was excluded due to the different adsorption characteristics of the coupling components used hitherto and which depend, moreover, to a large extent on the processing conditions. Therefore, mixtures of different diazo components for the preparation of developing dyes required special arrangements. It is known from German Auslegeschrift No. 2,449,782 to carry out printing with developing dyes on textile fabrics either containing or consisting of cellulose by printing the fabric with a printing paste containing (a) an alkaline solution of a coupling component suitable for the printing with developing dyes,
(b) a dispersion of an amine suitable for the preparation of developing dyes,
(c) sodium nitrite, and
(d) a printing thickener, and developing the print by acidic means, the formation of the dyestuff being initiated by acidic steaming.

Instead of said acidic steaming it has also been proposed that the formation of the dyestuff on the fiber is brought about by applying dilute aqueous solutions of organic acids having a minimum water-solubility of 30 g per 100 g of water, a pKa value of 4.0 to 2.5 at 20° C. and a boiling point 175° C. under normal pressure, and by subsequent steaming with neutral steam or by rapid drying (German Offenlegungsschrift No. 2,511,537).

In a further modification of the latter invention it is suggested to bring about the formation of the dyestuff by a short passage through the air and by contacting the material with an alkaline agent.

Subject of the present invention are dyeing preparations for preparing developing dyestuffs consisting of separate formulations of diazo components and coupling components which comprise these formulations containing molar quantities of active substance or several times these molar quantities in simple numerical proportions, per weight unit or volume unit, the formulation of the diazo component containing the diazotizible aromatic amine finely dispersed.

A further subject of the present invention is a process for preparing developing dyestuffs which comprises the use of the dyeing preparations of the invention and of their mixtures.

The use of the preparations according to the present invention with finely dispersed bases allows to carry out dyeing and printing processes being advantageous in various ways:

The dispersion of the bases ensured an immediate diazotizing and coupling on the fiber, for the bases are dissolved not later than upon contact with the nitrous acid to produce diazonium salts. Therefore, no problems arise due to the different affinities and cumbersome later adjustments of the baths can be dispensed with.

The immediate coupling also stands for a practically quantitative colour yield, so that the diazo component need not be used in excess quantities. Besides the economization of diazo component, there is also an ecological advantage insofar that waste water contamination by excessive diazo component is avoided. Of course, it is therefore no longer necessary to separate excessive diazonium salts by special manipulative steps, such as conveying them through a bisulfite bath, a fact which represents another economic and ecological advantage.

Particularly advantageous are the preparations of the invention, however, for preparing combination shades which had been difficult to realize according to the state of the art. Due to the immediate coupling on the fiber it is easily feasible to use several diazo components and/or coupling components simultaneously. In practice that means the special advantage of dispensing with any calculative operations since the components are present in "Normal" formulations.

The preparations according to the invention are especially advantageous for carrying out single-phase-processes, for example for the processes of said prior patent applications and for pad dyeing. In these cases the padding liquors and printing pastes contain the diazo components and coupling components in addition to the usual auxiliaries and sodium nitrite, the coupling components being present as alkaline solutions. After having applied this liquor or printing paste and after an optional intermediate drying step, the formation of the dyestuff on the fiber is initiated by acidic means and achieved, optionally, by increasing the temperature, residence time, alcaline supplementary treatment or a combination of such operations.

The compositions of the present invention comprising diazo components are prepared in accordance with German Auslegeschrift No. 2,449,782, with the proviso that the disperse amine be contained at the rate of one mol per weight unit or per volume unit or several times this rate in simple numerical proportions.

The coupling components are adjusted analogously, the adjusting operation may produce a neutral or an alcaline composition.

As coupling components to be used for this process, preferably low-substantivity or medium-substantivity aryl amides, especially phenyl amides or biphenyl diamides which may be substituted, of acetoacetic acid, of 2-hydroxy naphthalene-3-carboxylic acid or of heterocyclic o-hydroxy-carboxylic acid may be mentioned, for example 5-chloro-2-acetoacetylamino-1,4-diethoxy benzene, 4,4'-bis-(acetoacetylamino)-3,3'dimethyl diphenyl and 2-acetoacetyl-amino-6-ethoxy-benthiazole, as well as 2-hydroxy-naphthalene-3-carboxylic acid phenylamide and their derivatives which carry lower alkyl or lower alkoxy groups (of 1 to 4 carbon atoms) or chlorine atoms in the phenylamide radical, such as 2-hydroxy-naphthalene-3-carboxylic acid-(2'-methylphenyl-1')-amide, 2-hydroxy-naphthalene-3-carboxylic acid-(2'-methoxy-phenyl-1')-amide, 2-hydroxy-naphthalene-3-carboxylic acid-(3'-chloro-5'-methoxy-phenyl-1')-amide, and 2-hydroxy-carbazole-3-carboxylic acid-(4'-chlorophenyl-1')-amide.

Preferably used amines are not or only scarcely volatile with steam. This ensures not only a food reproducibility of the prints but also a number of further advantages: There is no need for devices that prevent amine vapor from escaping into the atmosphere during the printing, steaming and drying operations; operations of machinery need not be interrupted to remove condensed amines, and dyestuff classes can be used together with the developing dyes which are fixed by steaming.

These amines may be nitro-anilines which may be substituted, such as 2-nitro-aniline, 3-nitro-aniline, 4-nitro-2-amino-anisole, 5-nitro-2-amino-anisole, 5-nitro-2-amino-toluene or 5-nitro-4-amino-anisole; amino-carboxylic acid amides, especially benzoic acids which may be substituted, such as 5-amino-4-methoxy-benzoic acid amide; amino-sulfonic acid amides, especially benzene sulfonic acids which may be substituted, such as 2-amino-anisole-4-sulfonic acid diethylamide or 2-amino-anisole-4-sulfonic acid n-butylamide; aminonitriles, especially benzonitriles which may be substituted, such as 1-amino-2,5-dimethoxy-4-benzonitrile; benzoyl phenylene diamines which may be substituted, such as 1-amino-4-benzoyl-amino-2,5-dimethoxy-benzene, 1-amino-4-benzoylamino-2,5-diethoxy-benzene or 2-amino-4-methyl-5-benzoylamino-anisole; diamino-diphenyls, which may be substituted, such as o-toluidine or dianisidine, as well as other amines currently used in the ice color technique.

The phrase "which may be substituted" implies substitution by one or more identical or different substituents selected from alkyl or alkoxy of 1 to 4 carbon atoms, chlorine and bromine.

The dispersions of amines required for the new process may be prepared by various method which are known:

For example, adequate dispersions may be obtained by grinding an amine in an aqueous suspension, advantageously in the presence of a dispersing agent, to avoid formation of agglomerates; the grinding operation may be run in a roller or vibratory mill filled with balls; especially useful are ball mills provided with stirrers and filled with glass beads or natural sand. Fine divison using a so-called dissolver ofter also leads to useful results.

It is also possible to mix with water a solid composition that has been prepared by spray-drying a base dispersion containing a solid dispersing agent or by grinding a mixture of a solid dispersing agent and an amine, for example in a pin mill. Suitable dispersions may also be obtained by blending a solution of an amine and a suitable dispersing agent in a water-soluble solvent with water or the printing paste. If the dispersing agent is liquid and has a sufficiently high dissolving power for the amine, a particular solvent need not be used.

The dispersing agents used may be of anionic or non-ionic nature and belong, for example, to the following classes of substances:

Long-chain alkyl sulfonates, alkylaryl sulfonated, aryl sulfonates, lignin sulfonates, sulfonated cresol-formaldehyde resins, condensation products or formaldehyde and naphthalene sulfonic acids, alkanoyl amino-sulfonic acids, alkyl polyglycol ethers, alkylaryl polyglycol ethers, aryl polyglycol ethers, or acyl polyglycol esters.

The dispersions consist of from about 25 to 60% of base and from bout 4 to 15% of the dispersing agent. In addition, they man contain an agent, such as glycol or glycerol, to prevent freezing or drying, or a fungicidal agent, such as pentachlorophenol, to suppres potentiol formation of mould during a prolonged period of storage.

The so-called average particle size (according to RAMLER-ROSIN; (Chemie Ingenieur Technik 36/1964) 523 et seq.) should be 0.002 mm or less in order to ensure satisfactory prints according to the invention, as far as color intensity (tinctorial strength) and uniformity are concerned.

As printing thickeners, any thickener which is resistant to alkali and of low solids content may be used, for example locust been flour ether thickeners.

The printing pastes may also contain conventional printing aids, such as glycerol, diglycol or dihydroxy-diethyl sulfide.

If the dyestuff is to be developed by acidic steaming, the prints that habe been dreid in a drying chamber or box are developed in a steamer by means of steam containing acid agents, preferably formic acid or a mixture of formic acid/acetic acid, preferably by means of superheated steam, at a temperature of from about 130° to 150° C.; adequate passage times for the development of the dyes ranging from 5 to 20 seconds.

If the dyestuff is to be developed by applying an acid solution, all the organic monohydroxy monocarboxylic acids, dihydroxy dicarboxylic acid, monohydroxy tricarboxylic acids or halocarboxylic acids which have a water-solubility of at least 30 g in 100 g of water, a pK value of from 4.0 to 2.5 at 20° C. and, at normal pressure, a boiling point of more than 175° C. are suitable, for example lactic acid, glycolic acid, tartaric acid, citric acid or monochloroacetic acid.

These acids are transferred onto the preliminarily printed and dried textile material in an amount of from 50 g/l to 300 g/l of water, preferably 100 g to 200 g/l of water, by padding, slop-padding, spraying or cross-printing with the help of an entirely engraved stipping rolling or a full-printing screen.

Diazotization and coupling which yield the final dyestuff set in spontaneously and almost at the same time, so that—in the simplest case—a continuous air passage of from 40 to 90 seconds is sufficient to complete the development of the dye. The development of the dyestuff can be substantially accelerated by using heat, for example by treating the print with hot air at 130°–160° C. during 20 to 60 seconds in a heating chamber, or by neutral steaming with saturated or superheated steam during 10 to 20 seconds at 100°–150° C.

If the dyestuff is to be developed by means of solutions of organic solvents, the printing pastes may contain, in addition to the components for the developing dyes, also soluble leuco sulfuric acid ester vat dyes which permit a further increase in the coloration possibilities. In the so-called Africa print, this possibility opens up completely new prospects since, for example with an addition of Sol. Vat Blue 1, C.I. No. 73002, it is possible in a simple manner to produce a strikingly resembling imitation of indigo which is preferably used for the Africa printing and in the batik industry.

A particular advantage of the new process in the possibility of using two different coupling components or amines, thus presenting interesting coloring effects.

The following Examples illustrate the invention by means of comparisons which make evident the much simpler use of the preparations of the invention. The following abbreviations are used:

H.W. = commercial goods (the concentration of active substance is indicated)

AV 71 = printed pamphlet of Messrs. Farbwerke Hoechst AG: "NAPHTOL AS-Anwendungsvorschriften" (Naphtol AS-scope of applications), Hoe. 4026

R 55 = book of Messrs. Farbwerke Hoechst AG: "Manual for the Dyeing with Naphtol AS Products", Hoe. 2275 e The Colour-Index (C.I.) numbers refer to the third eddition (1971). The indications of percentages, parts and ratios refer to the weight, unless otherwise stated.

The diazo components (Azoic Diazo components) of all Examples include the aromatic amines finely dispersed, the average particle size (according to RAMLER-ROSIN) being 0.002 mm or less.

EXAMPLE 1

(a) An orange print pattern onto a causticized staple fiber fabric is to be produced according to the so-called "Naphtholate/Nitrite-Process" based on Azoic Coupling Component C.I. No. 37,558 (H.W. 37;8%) and Azoic Diazo Component C.I. No. 37,111 (H.W. 26;4%). A medium color intensity requires about 10 g/kg of fixed coupling component. The conversion factor for the diazo component is, in accordance with AV 71, 0.9, for the liquid preparation 1.8; that means that per 10 g/kg of azoic coupling component C.I. No. 38,588, 18 g/kg of azoic diazo component C.I. No. 37,111 have to be applied.

| Printing formula: | 10 g of Diazo Coupling Component C.I. No. 37,558 are dissolved in a mixture of 10 ml of ethanol<br>15 g of $\beta,\beta'$-dihydroxydiethylsulfide<br>5 ml of sodium hydroxide solution of 38° Bé (32.5%) and dissolved<br>20 ml of water (at 40° C.) and diluted with further<br>100 ml of water. Into<br>400 g of an 8% aqueous thickener of a non-ionogeneous locust bean flour ether are stirred first these<br>160 ml of dissolved coupling component, then<br>90 ml of the amine dispersion C.I. No. 37,111 diluted with water at the ratio of 1:5, and finally<br>30 ml of sodium nitrite solution 1:2 and adjusted to 1 kg by means of water or thickener. |
|---|---|

This printing paste is printed onto the causticized staple fiber fabric by means of a common flat printing screen and, after intermediate drying, slop-padded on a padding mangle with a cold aqueous solution of 150 g/l of monochloroacetic acid, and subjected to steaming for 30 seconds with steam superheated to 130° C.

At the end of the usual supplementary treatment, an orange printing pattern is obtained having the known good fastness properties.

(b) According to the present invention: The presence of both reactants in molar ratios, being Azoic Coupling Component C.I. No. 37,558 with a molar weight of 307 adjusted to a concentration of 30.7% and the Azoic Diazo Component C.I. No. 37,111 (mol. weight 214) adjusted to a concentration of 21.4%.

allows to omit the application of AV 71 for determining the conversion factor so as to realize the best possible reaction ratios, since both reactants may be used in the printing paste at the ratio of 1:1. This fact also economizes considerable quantities of diazo component that would have been applied normally in excess quantities as a certain safety margin.

The application of 12 g Azoic Coupling Component C.I. No. 37,558 (30.7%) and 12 g of Azoic Diazo Component C.I. No. 37,111 (21.4%)

with the aforementioned printing procedure produces the same intense orange shade as the conventional printing method, while at the same time the printing method of the invention allows for economizing 4.2 g/kg of Azoic Diazo Component.

EXAMPLE 2

(a) For printing a bleached and mercerized cotton poplin with an intense dark-brown shade, a mixture of Azoic Coupling Component C.I. No. 37,505 (H.W. 32.4%)

Azoic Coupling Component C.I. No. 37,613 (H.W. 40%) and of an Azoic Coupling Component of the following composition Ni-phthalocyanine-tetra-[sulfonic acid-3′-(5″-hydroxy-3″-methyl-pyrazolyl-1″)]-phenyl-1′-amide (H.W. 78%) is coupled at the ratio 4:2:4 with the disperse liquid preparation of Azoic Diazo Component C.I. No. 37,125 (H.W. 41.5%).

For that purpose it is first necessary to prepare three printing pastes in usual manner from coupling component and amine each and subsequently to work-up these "stock pastes" at the desired ratio 4:2:4 to yield a printing paste.

In accordance with AV 71 the individual conversion factors of the Azoic Diazo Component C.I. no. 37,125 to the aforementioned coupling components are 0.8, 0.7 and 0.4 and for the liquid formulations: 1.2, 2.0 and 1.4.

The batches of the three stock pastes are calculated accordingly to 32 g/kg Azoic Coupling Component C.I. Nr. 37 505
26 g/kg Azoic Diazo Component C.I. Nr. 37 125 liquid
40 g/kg Azoic Coupling Component C.I. Nr. 37 613
20 g/kg Azoic Diazo Component C.I. Nr. 37 125 liquid
20 g/kg Azoic Coupling Component of the a.m. composition
14 g/kg Azoic Diazo Component C.I. Nr. 37 125 liquid These stock pastes prepared according to Example 1 were then blended at the ratio 4:2:4 and applied onto the cotton poplin material by meaans of a stencil. After the acidic fixation described in Example 1 and supplementary treatment an intense dark-brown printing pattern is obtained, having the known good fastness properties.

(b) According to the invention: If all reactants are now applied at molar ratios, the cumbersome calculation of the batches and the separate preparation of the stock pastes can be dispensed with. All components are charged in one printing paste directly, the sum of the three coupling components has to be equal to the quantity in grams of the diazo component used.

Azoic Coupling Component C.I. No. 37,505 liquid (26.3% = 1 N)
Azoic Coupling Component C.I. No. 37,613 liquid (27.1% = 1 N)
Azoic Coupling Component according to the a.m. composition, powder (78% = N/2)
Azoic Diazo Component C.I. No. 37,135 liquid (33.6% = 2 N)

Taking into consideration a mixing ratio of 4:2:4, a printing paste batch of

1 × 8 g/kg Azoic Coupling Component C.I. No. 37,505 liquid
1 × g/kg Azoic Coupling Component C.I. No. 37,613 liquid
2 × 8 = 16 g/kg Azoic Coupling Component, powder, of a.m. composition
½ × 20 = 10 g/kg Azoic Diazo Component C.I. No. 37,135 liquid is obtained which produces the identical brown shade by a much simpler way and economizing quite a lot of dyestuff.

EXAMPLE 3

(a) Continuous dyeing on a padding machine is carried out according to the following manipulative process:
impregnating with the solution of a naphthol
intermediate drying
developing the impregnated material by padding with an amine dispersion
aftertreatment of the dyeing.

For preparing a medium blue shade based on Azoic Coupling Component C.I. No. 37,520, liquid (H.W. 34.2%) and Azoic Diazo Component C.I. No. 37,235, liquid (H.W. 60%) requires 12 g of fixed coupling component per kg of material to be dyed. That means, at a liquor pick-up of 80%, 15 g/l of Azoic Coupling Component C.I. No. 37,520, liquid and, when taking into consideration a conversion factor according to AV 71 of 2.5, 37.5 g/l of Azoic Diazo Component C.I. No. 37,235, liquid.

After the impregnation at a padding temperature as high as possible and prior to the intermediate drying step a more thorough penetration of the dyestuff is ensured by a passage through the air. Subsequently, development takes place on the padding machine by double immersion, followed by a second passage through the air and a usual aftertreatment.

The result is a bright blue shade with very good fastness properties.

(b) According to the invention: Both reactants being now present at equimolar ratios,
Azoic Coupling Component C.I. No. 37,520 (mol. wt. 277), 27.7% liquid, 1 N
Azoic Diazo Component C.I. No. 37,235 (mol. wt. 244), 48.8%, liquid 2 N
preparation of the desired blue shade is feasible by simple combination of
18 g/l of Azoic Coupling Component C.I. No. 37,520 (27.7%, 1 N)
by developing with
9 g/l of Azoic Diazo Component C.I. No. 37,235 (48.8%, 2 N).

In addition to this simplified calculation of the batches, economizing 2.2 g of diazo component per liter of padding liquor is liquor is another advantage.

EXAMPLE 4

(a) The preparation of a golden yellow-shaded printed pattern based on
Azoic Coupling Component C.I. No. 37,610 (H.W. 99.5%) and
Azoic Coupling Component C.I. No. 37,125 (H.W. 45%) according to the printing paste batch specified in Example 1 for the "naphtholate/nitrite process" requires 16 g/kg of the coupling component for obtaining a deep color shade. According to AV 71 the conversion factor, while simultaneously converting to the liquid preparation, is 5.1×0.2=1.02; thus a quantity of 16×5.1×0.2=16.3 kg of Azoic Diazo Component C.I. No. 37,125 is used necessary per kg of printing paste.

After the printing and drying steps, the fabric is impregnated with a 2% cold aqueous solution of monochloroacetic acid (liquor pick-up 80%) on a nip padding machine and the dye is developed contuinuously during an 80 seconds passage through the air which follows directly. After the usual supplementary treatment a pattern in a deep golden yellow shade is obtained which exhibits the known good fastness properties.

(b) According to the present invention: If both reactants are present at equimolar ratios, i.e.
Azoic Coupling Component C.I. No. 37,610 with a molecular weight of 382 adjusted to a 38.2% preparation and
the Azoic Diazo Component C.I. No. 37,125 (Mol. Wt. 168) adjusted to a 16.8% preparation,
both components are to be blended at the ratio of 1:1 for obtaining the desired color shade at the best possible reaction conditions; for the present case that means 19 g of Azoic Coupling Component C.I. No. 37,610 (38.2%) and
19 g of Azoic Diazo Component C.I. No. 37,125 (16.8%)

In addition to this simplified calculation of the batches, economizing 6.7 g/kg of Azoic Diazo Component is another advantage.

EXAMPLE 5

(a) A bleached grey cotton cloth is to be printed in a deep current shade based on
Azoic Coupling Component C.I. No. 37,530 (H.W. 36.1%).
To obtain this result, a mixture of
Azoic Diazo Component C.I. No. 37,125 (H.W. 41.4%) with
Azoic Diazo Component C.I. No. 37,255 (H.W. 26.4%) is required at the ratio of 5:3. For a printing paste batch with 16 g/kg of Azoic Coupling Component C.I. No. 37,530 the conversion factor according to AV 71 (while taking into consideration the liquid composition) is
for Azoic Diazo Component C.I. No. 37,125=0.7 and for
Azoic Diazo Component C.I. No. 37,255=2.1;
calculated on the stock pastes to be prepared separately, for a quantity of 16 g/kg of Azoic Coupling Component C.I. No. 37,590 are to be used
16×0.7=11.2 g/kg of Azoic Diazo Component C.I. No. 37,125
or
16×2.1=33.6 g/kg of Azoic Diazo Component C.I. No. 37,255.

Both stock pastes are blended at the ratio of 5:3, printed according to Example 1, subjected to intermediate drying and finished.

(b) According to the present invention: If both components are present at an equimolar ratio, i.e.
Azoic Coupling Component C.I. No. 37,530 with a molecular weight of 293, adjusted to a 29.3% preparation,
the Azoic Diazo Component C.I. No. 37,125 (mol.wt. 168) adjusted to a 16.8% preparation
and the Azoic Diazo Component C.I. No. 37,255 (mol.wt. 214) adjusted to a 21.4% preparation, the separate preparation of stock paste batches can be dispensed with. All three reactants are charged directly into the printing paste described in Example 1, the only point is that the sum of both diazo components (in grams) has to be equal to the quantity (in grams) of the coupling component employed.

Per 20 g/kg of Azoic Coupling Component C.I. No. 37,530 (1 N) and with respect to the mixture ratio of 5:3 are used 12.5 g/kg of Azoic Diazo Component C.I. No. 37,125 (1 N)
and
7.5 g/kg of Azoic Diazo Component C.I. No. 37,255 (1 N).

Not only that this printing paste batch is simplified in calculation and manipulation, another intersting aspect is the econimization of 3.4 g/kg or 4.3 g/kg of pure dyestuff in both diazo components.

EXAMPLE 6

(a) Another possibility for printing a deep dark-brown color shade consists in combining a reddish yellow with a reddish blue. In accordance with the practice prevalent hitherto, that means the preparation of two printing pastes, for example based on Azoic Coupling Component C.I. No. 37,610 (H.W. 34.2%)
and
Azoic Diazo Component C.I. No. 37,125 (H.W. 41.4%)
as well as
Azoic Coupling Component C.I. No. 37,530 (H.W. 36.1%)
and
Azoic Diazo Component C.I. No. 37,255 (H.W. 26.4%)
and the work-up of same at the ratio of approximately 3:7 to yield a printing paste.

The use of the conversion factors of AV 71 produces the following batches:

16 g/kg of Azoic Coupling Component C.I. No. 37,610
and
16×2.0=32 g/kg of Azoic Diazo Component C.I. No. 37,125, liquid
as well as
16 g/kg of Azoic Coupling Component C.I. No. 37,530
and
16×2.1=33.6 g/kg of Azoic Diazo Component C.I. No. 37,255, liquid.

These two printing pastes which have been charged according to Example 1 are then blended at the ratio of 3:7 to yield a printing paste and finally printed onto a cotton fabric. The development and finish is carried out as described in Example 1 to produce a deep dark-brown shade.

(b) According to the present invention: If the four reactants involved are used in equimolar compositions, the preparation of separate batches of stock pastes can be dispensed with. The dyestuff components are used in one printing paste, the only point is that the sum of both coupling components (in grams) has to be equal to the sum of both diazo components (in grams), in order to guarantee the best possible reaction ratios.

4.8 g/kg of azoic Coupling Component C.I. No. 37,610 (Mol. Wt. 382), 38.2%
11.2 g/kg of Azoic Coupling Component C.I. No. 37,539 (Mol. Wt. 293), 29.3%
4.8 g/kg of Azoic Diazo Component C.I. No. 37,125 (Mol. Wt. 168), 16.8%
11.2 g/kg of Azoic Diazo Component C.I. No. 37,255 (Mol. Wt. 214), 21.4%

An identical deep dark-brown color shade is achieved by carrying out printing in such a simplified manner which, moreover, allows economization of considerable quantities of pure deystuff (3.1 or 4.4 g/kg of diazo component).

EXAMPLE 7

(a) For producing a bright scarlet shade upon dyeing a bleached and mercerized cotton cambric according to the one-step pad-dyeing process and while using disperse fast colour bases (liquid), a quantity of 16 g/kg of fixed Azoic Coupling Component C.I. No. 37,530 (H.W. 36.1%)

is required, corresponding at a liquor pick-up of 75% to 20 g of coupling component per liter of padding liquor. A quantity of 20×0.7=14 g/l of Azoic Diazo Component C.I. No. 37,130 (H.W. 41.4%)

is required for the developing step, according to the conversion factor of AV 71.

Both components are introduced into the slightly thickened padding liquor and blended with a dispersing agent and sodium hydroxide solution; finally are added 10 g/l of sodium nitrite.

After the padding and drying steps, the fabric is impregnated with a cold aqueous 20% solution of monochloroacetic acid (liquor pick-up of 80%), and the dyestuff is developed continuously during a passage through the air of 80 seconds which follows immediately. At the end of the usual supplementary treatment the result obtained is a bright scarlet color shade with the known good fastness properties.

(b) According to the present invention: Now, if both dyestuff components are used in equimolar liquid compositions, Azoic Coupling Component C.I. No. 37,530 (Mol. Wt. 293) 29.3%
and Azoic Diazo Component C.I. No. 37,130 (Mol. Wt. 168) 33.6% (2 N);
quantities of
24 g/l of Azoic Coupling Component C.I. No. 37,530 (29.3% liquid)
with 12 g/l of Azoic Diazo Component C.I. No. 37,130 (33.6% liquid) (2 N)

have simply to be used in the printing paste according to (a). This method avoids for one the conversion to the degree of purity of the commercial goods—being common practice hitherto and moreover economizes 2.6 g of diazo components per liter of padding liquor.

We claim:

1. A prepared composition adapted to simplify and make more efficient the production of developing dyes, consisting of:
   (1) a first preparation being a Normal formulation of a finely dispersed diazotizable free primary aromatic amine, the average particle size of said amine being at most 0.002 mm, and
   (2) a second preparation being a Normal formulation of a coupling component, the amounts of said first and second preparations being chosen so as to provide therein the molar equivalent amounts of the said amine and coupling component, said amine and coupling components being in a molar ratio of 2:1, 1:1 or 1:2 to one another.

* * * * *